(12) United States Patent
Meneses Herrera et al.

(10) Patent No.: US 10,680,528 B2
(45) Date of Patent: Jun. 9, 2020

(54) CURRENT BALANCE CONTROL FOR RESONANT CONVERTERS SYSTEMS

(71) Applicant: Infineon Technologies Austria AG, Villach (AT)

(72) Inventors: David Meneses Herrera, Villach (AT); Matteo-Alessandro Kutschak, Ludmannsdorf (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/100,891

(22) Filed: Aug. 10, 2018

(65) Prior Publication Data

US 2019/0052180 A1 Feb. 14, 2019

(30) Foreign Application Priority Data

Aug. 11, 2017 (DE) .................. 10 2017 118 359

(51) Int. Cl.
*H02M 3/335* (2006.01)
*H02M 3/28* (2006.01)
*H02M 1/00* (2006.01)
*H02J 50/12* (2016.01)

(52) U.S. Cl.
CPC ... *H02M 3/33592* (2013.01); *H02M 3/33561* (2013.01); *H02J 50/12* (2016.02); *H02M 3/285* (2013.01); *H02M 2001/0032* (2013.01); *H02M 2001/0058* (2013.01); *Y02B 70/1433* (2013.01); *Y02B 70/1475* (2013.01)

(58) Field of Classification Search
CPC ......... H02M 3/33592; H02M 3/33561; H02M 3/285; H02J 50/12; Y02B 70/1416; Y02B 70/1458; Y02B 70/1433; Y02B 70/1475
See application file for complete search history.

(56) References Cited

U.S. PATENT DOCUMENTS

| 6,445,597 B1 | 9/2002 | Boylan et al. |
| 2010/0026095 A1 | 2/2010 | Phadke |
| 2015/0229225 A1* | 8/2015 | Jang ...................... H02M 3/285 363/17 |
| 2018/0091059 A1* | 3/2018 | Nene ................. H02M 3/33507 |

OTHER PUBLICATIONS

TIDUCT9 ("Two-Phase Interleaved LLC Resonant Converter Design With C2000™ Microcontrollers," Texas Instruments Incorporated, Jan. 2017).*
Y. Jang, M. M. Jovanović, J. M. Ruiz, M. Kumar and G. Liu, "A novel active-current-sharing method for interleaved resonant converters," 2015 IEEE Applied Power Electronics Conference and Exposition (APEC), Charlotte, NC, 2015, pp. 1461-1466. (Year: 2015).*

* cited by examiner

*Primary Examiner* — Jue Zhang
*Assistant Examiner* — Jye-June Lee
(74) *Attorney, Agent, or Firm* — Murphy, Bilak & Homiller, PLLC

(57) ABSTRACT

Controllers, systems and methods are presented related to resonant converters. In case of a load imbalance between the resonant converters, an on-time of a synchronous rectifier switch of one of the resonant converters is reduced.

20 Claims, 9 Drawing Sheets

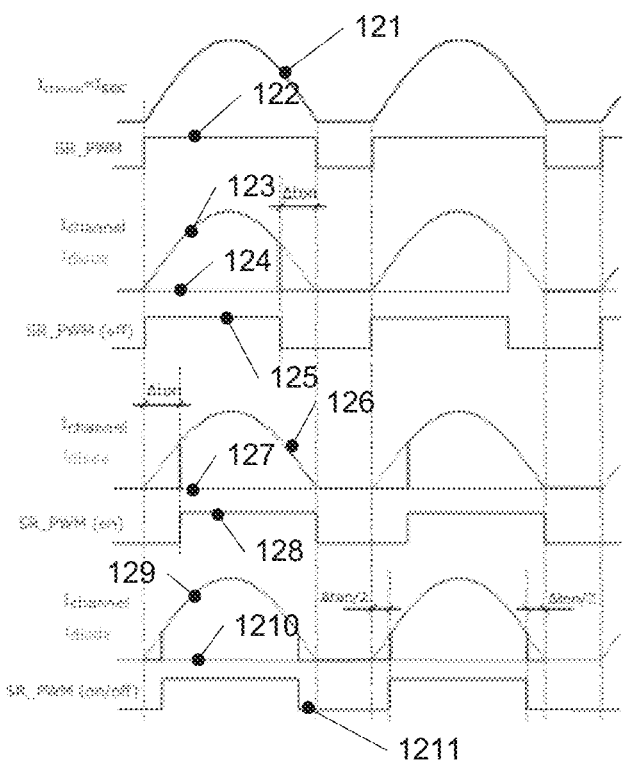
Fig. 11A
Fig. 11B
Fig. 11C
Fig. 11D
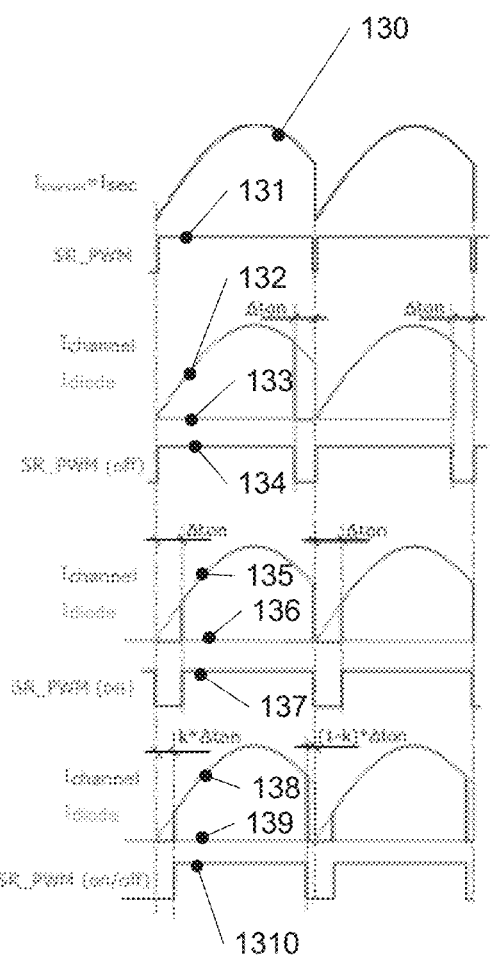
Fig. 12A
Fig. 12B
Fig. 12C
Fig. 12D

CURRENT BALANCE CONTROL FOR RESONANT CONVERTERS SYSTEMS

TECHNICAL FIELD

The present application relates to controllers for resonant converter systems, corresponding resonant converter systems and corresponding methods.

BACKGROUND

A tendency exists in some applications like server or telecom power systems towards increasing a power density in the systems by increasing a required output power of a power supply while keeping the same or even reducing the power supply form factor. As a consequence, more efficient power supplies are required. Furthermore, a high efficiency of such power supplies is needed over a wide load range including light load operation, for example in sleep mode or other low power mode of systems.

For such applications, resonant converters are increasingly used. Resonant converters are a type of electric power converters that contain a network of inductors and capacitors referred to as "resonant tank", tuned to resonate at a specific frequency. One specific type of resonant converters are so-called LLC converters, where the resonant tank includes a series connection of two inductors, one of them being a primary winding of a transformer.

In high output current applications, i.e. applications where a high output current is required at least during some times such as server and telecom power supply systems providing a plurality of power supplies in parallel is a common practice. In particular, in such applications more than one resonant converter may be used in parallel. Often the resonant converters of such an arrangement are controlled in an interleaved manner by applying phase delays in signals controlling the converters. In this way, currents output by individual converters of a system are phase shifted with respect to each other. This may provide advantages such as reduced current stress, loss distribution among the converters, easier thermal management, heat sink reduction or output current ripple reduction. Because of the output current ripple reduction, a size of an output filter usually used for such converter systems may be considerably reduced compared to a case without interleaving.

Furthermore, in such systems so-called phase shedding techniques may be used, which essentially means that in light load conditions one or more of the converters are deactivated, and only the remaining converters continue to operate. This may lead to reducing current consumption under light load conditions.

Resonant converters typically use the switching frequency as a control parameter in order to modify gain characteristics of the resonant tanks, for example to thereby adjust an output voltage of the resonant converter. In arrangements where a plurality of such converters are used, and to implement the above-mentioned interleaving, all of the resonant converters usually need to operate at the same switching frequency, and phase delays are applied between control signals having this switching frequency for different converters.

Resonant tanks of such converters are manufactured with a manufacturing tolerance. Operation of the tanks of different converters with the same switching frequency, due to such tolerances, may lead to a poor current balance among the converters, i.e. one converter providing more power than another converter, which in a worst case can lead to one of the converters handling most of the power.

In this case, overcurrent or overpower protections may be triggered, thus turning off the converter, or the converter may be damaged due to elevated current stress.

For example, in some LLC converters according to simulations a 3% variation in parameters of the resonant tank (inductivity of inductors and capacitances of capacitors) may lead to a current imbalance of 65% compared to a nominal output current for each converter.

Various solutions have been proposed for this problem, including application of separate current loops or using a common inductor. Other techniques include providing adjustable elements (inductors and/or capacitors) in the resonant tank or providing gain boosts by effectively short circuiting a secondary side of a transformer used in the converter.

These conventional approaches have various drawbacks like not being able to use interleaving techniques, additional area requirements for adjustable components or an inability to use switching frequencies at or above a resonance frequency of the resonant tank.

SUMMARY

According to an embodiment, a controller is provided. The controller comprises: a plurality of inputs configured to receive signals indicative of a load condition of a plurality of resonant converters; a plurality of outputs configured to output control signals controlling synchronous rectifier switches of the plurality of resonant converters; and a control circuit configured to reduce an on-time of a synchronous rectifier switch of a first converter of the plurality of resonant converters having a higher load than at least one second converter of the plurality of resonant converters via the respective control signal compared to a nominal case where synchronous rectifier switches of all converters have equal on-times (e.g. where no time reduction is applied).

According to another embodiment, a system is provided. The system comprises: a plurality of resonant converters, at least one of the plurality of resonant converters including a synchronous rectifier circuit; and a controller as defined above coupled to the plurality of converters.

According to another embodiment a method is provided, the method comprising: receiving information indicative of a load distribution between a plurality of resonant converters, and reducing an on-time of a synchronous rectifier switch of a first resonant converter of the plurality of resonant converters compared to a nominal case where an on-time of synchronous rectifier switches are equal in all of the plurality of resonant converters in response to detecting a load imbalance based on the information.

The above summary is merely intended to give a brief overview over some embodiments and is not to be construed as limiting in any way.

BRIEF DESCRIPTION OF THE DRAWINGS

FIGS. 11A-11D illustrate examples for on-time reduction if a switching frequency is below the resonance frequency of a resonant tank of a converter.

FIGS. 12A-12D illustrate examples corresponding to FIGS. 11A-11D for a case where the switching frequency is above the resonance frequency of the resonant tank.

DETAILED DESCRIPTION

Figure 1:
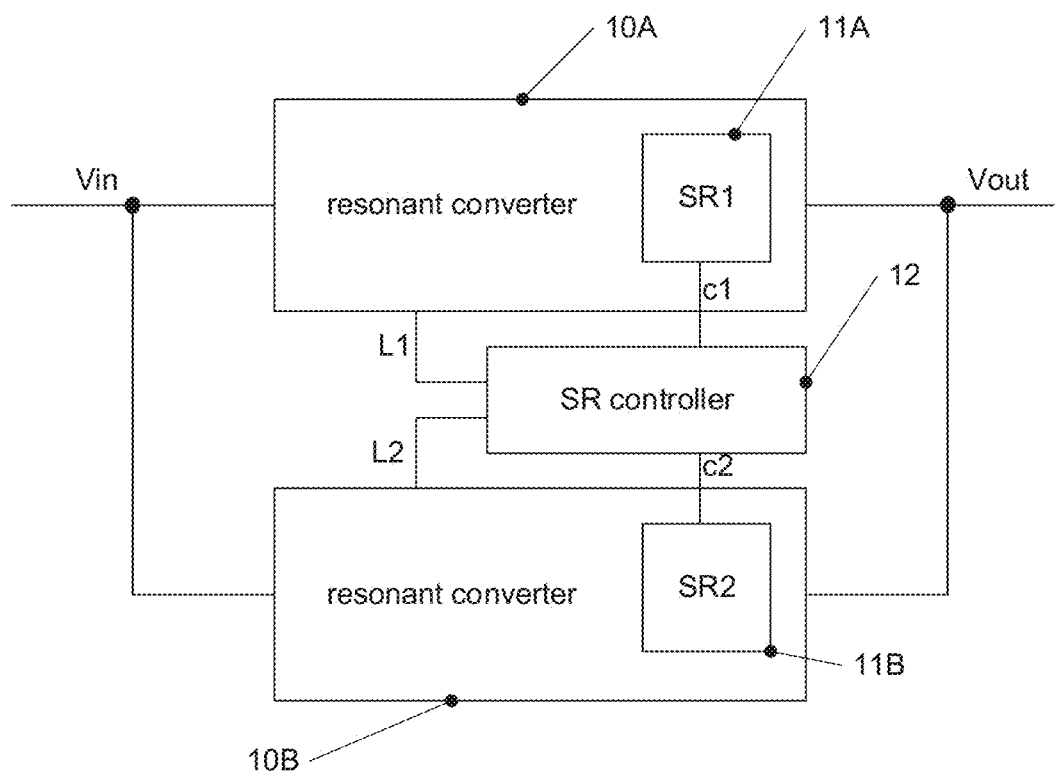
FIG. 1 illustrates a block diagram of a system according to an embodiment.

In the following, various embodiments will be described in detail. It should be noted that these embodiments are given by way of example only and are not to be construed as limiting in any way. For example, while embodiments are described as comprising a plurality of features or elements, in other embodiments some of these features or elements may be omitted and/or may be replaced by alternative features or elements. Furthermore, in addition to the features or elements explicitly shown and described, other features or elements, for example feature or elements used in conventional resonant converter systems, may be provided.

Modifications and variations described with respect to one of the embodiments may also be applied to other embodiments. Features or elements of different embodiments may be combined to form further embodiments.

In the embodiments shown and described, any direct electrical connections between components or elements, i.e. any connection or coupling without intervening elements (for example a simple metal connection or wire) may also be replaced by an indirect connection or coupling, i.e. a connection or coupling comprising one or more additional intervening elements, as long as the general purpose of the connection or coupling, for example to provide a certain kind of information, to provide electrical energy or to provide a certain kind of control, is essentially maintained. In other words, connections or couplings may be modified as long as the general functioning of the connection or coupling is essentially unaffected.

In some of the embodiments described below, LLC converters are used as an example for resonant converters. However, techniques discussed herein may also be applied to other types of converters, for example series resonant inverters, parallel resonant converters, class E resonant converters, class E rectifiers, zero voltage switching resonant converters, or zero current resonant converters, to give a few examples.

Embodiments discussed herein use switches, in particular transistor switches. An on-state or closed state is a state where the switch provides a low-ohmic connection between terminals of the switch, whereas an off-state or open state is a state where the switch essentially (possibly apart from leakage currents) provides an electric isolation between the terminals. An on-time designates a time during which the switch is on (closed).

It should be emphasized that any numerical values given herein or in the drawings are merely examples, and may depend on specific implementations. Therefore, these are not to be construed as limiting.

Turning now to the Figures, FIG. 1 illustrates a system according to an embodiment. The system of FIG. 1 comprises first resonant converter 10A and a second resonant converter 10B. For rectification of an output current of first resonant converter 10A, first resonant converter 10A comprises a first synchronous rectifier (SR) 11A. Synchronous rectifiers, also sometimes referred to as active rectifiers, are rectifiers used for improving an efficiency of rectification by replacing diodes used in conventional rectifiers with actively controlled switches such as transistors, usually power MOSFETs or power bipolar junction transistors. Likewise, second resonant converter 10B comprises a second synchronous rectifier 11B.

It should be noted that while two resonant converters 10A, 10B are shown in FIG. 1 and other embodiments discussed later, techniques discussed herein may be applied to resonant converter systems comprising any number of resonant converters. Sometimes, the individual interleaved control the individual resonant converters are also referred to as "phases".

First and second resonant converters 10A and 10B receive an input voltage Vin and output a output voltage Vout, which may be a regulated output voltage. Any conventional regulation techniques may be used, in particular controlling resonant converters 10A, 10B with a switching frequency depending on the output voltage. Resonant converters 10A and 10B may be controlled in an interleaved manner and/or may employ phase shedding techniques. As these techniques are per se conventional techniques they will not be discussed here in greater detail.

Instead, next techniques for load balancing between the converters according to various embodiments will be discussed, where load imbalances may for example be caused by manufacturing tolerances or other deviations between resonant tanks of first and second resonant converters 10A, 10B.

The system of FIG. 1 further comprises a synchronous rectifier controller 12 controlling switching of first synchronous rectifier 11A via a first control signal c1 and switching of second synchronous rectifier 11B via a control signal c2. Controller 12 receives a first signal L1 indicating a load (for example output current) of first resonant converter 10A and a signal L2 indicating a load of second resonant converter 10B. Signals L1 and L2 may by any signals indicative of a load and may be measured for example on a primary side of a transformer included in resonant converters 10A, 10B or on a secondary side of the transformer. In case there is a load imbalance between first resonant converter 10A and second resonant converter 10B, i.e. if signals L1 and L2 indicate different loads, SR controller 12 reduces on-times of at least one switch of the respective synchronous rectifier 11A or 11B of the converter that has the higher load compared to a nominal case. The nominal case is a case where first and second resonant converters 10A, 10B have equal properties of their resonant tank and therefore there is no load imbalance when both synchronous rectifiers 11A, 11B are controlled by the same control signals, and have the same on-time of switches.

In such a case where the on-time is reduced, some current may be conducted not via a closed and therefore low ohmic switch, but via a diode in parallel to the switch which may be a parasitic diode or an explicitly provided freewheeling diode. Conduction through the diode causes losses, which reduces the load imbalance between the resonant converters. Specific examples will be discussed further below.

Figures 2A, 2B:
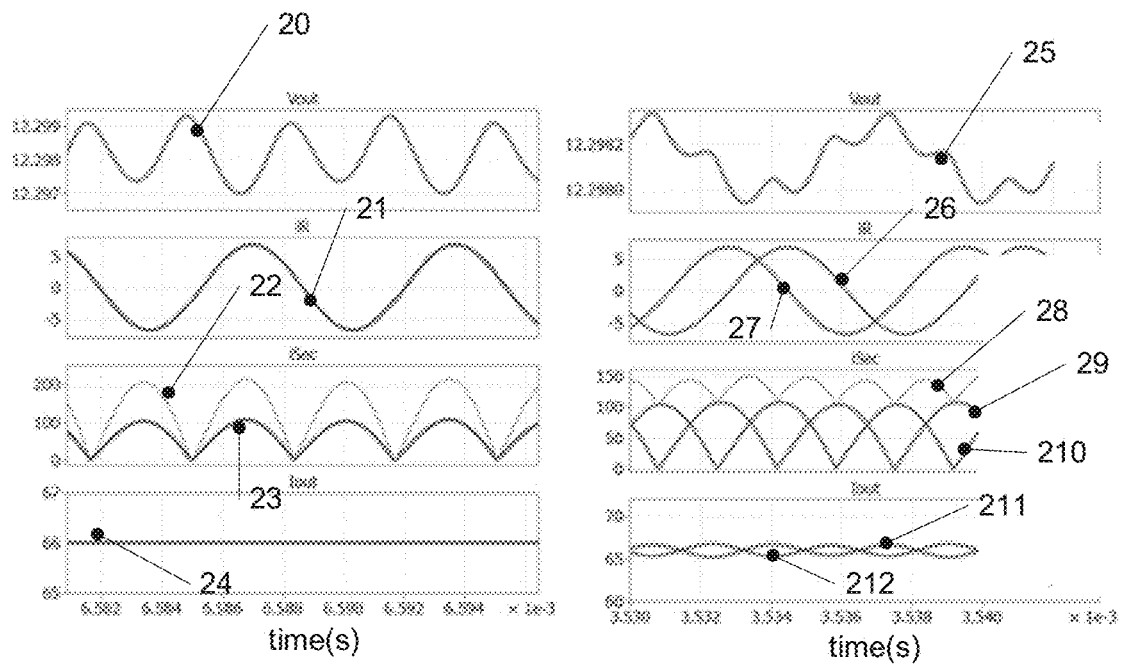
FIGS. 2A and 2B illustrate two different ways in which resonant converters of the system may be controlled, an operation without interleaving in FIG. 2A and an operation with interleaving in FIG. 2B.

Before discussing more specific embodiments in more detail, some other properties of resonant converters 10A, 10B of FIG. 1 and control thereof will be discussed referring to FIGS. 2-4. FIGS. 2A and 2B illustrate two different ways in which resonant converters 10A and 10B may be controlled, an operation without interleaving in FIG. 2A and an operation with interleaving in FIG. 2B. FIGS. 2A and 2B illustrate the behavior of an ideal case where resonant converters 10A, 10B have equal resonant tanks and therefore a same behavior, without deviations due to tolerances which will be discussed after that referring to FIG. 3.

In FIG. 2A, both resonant converters 10A, 10B are operated in phase, i.e. signals controlling resonant converters 10A, 10B do not have a phase difference between them. Therefore, also the output voltages, output currents and other signals in resonant converters 10A, 10B are in phase in this case. A curve 20 illustrates an example output voltage Vout of the converter system. A curve 21 illustrates a resonant current in each resonant tank of converter 10A, 10B (as mentioned, as the converters are nominally equal and are controlled without phase delay, the resonant currents are the same). A curve 23 illustrates a secondary side current (i.e. a current of a secondary side of a transformer of each converter) and a Curve 22 illustrates the sum of the secondary currents, in this case simply curve 23 multiplied by two. A curve 24 illustrates the output current of each converter 10A, 10B.

FIG. 2B illustrates a case where the two converters 10A, 10B are operated with interleaving, i.e. with a phase shift between control signals. Here, as shown in curves 26 and 27, resonant currents of the two converters are phase shifted with respect to each other, and secondary side currents 29, 210 of the two converters are also phase shifted. This leads to a total secondary current as indicated by a curve 28. Also, output currents 211, 212 of the resonant converters 10A, 10B are phase shifted with respect to each other. This leads to an output voltage indicated by a curve 25 in FIG. 2B. Generally, less ripple occurs and the difference between a maximum and minimum output voltage is smaller than in case of FIG. 2A. Therefore, in this case smaller output filters may be used.

Figure 3:
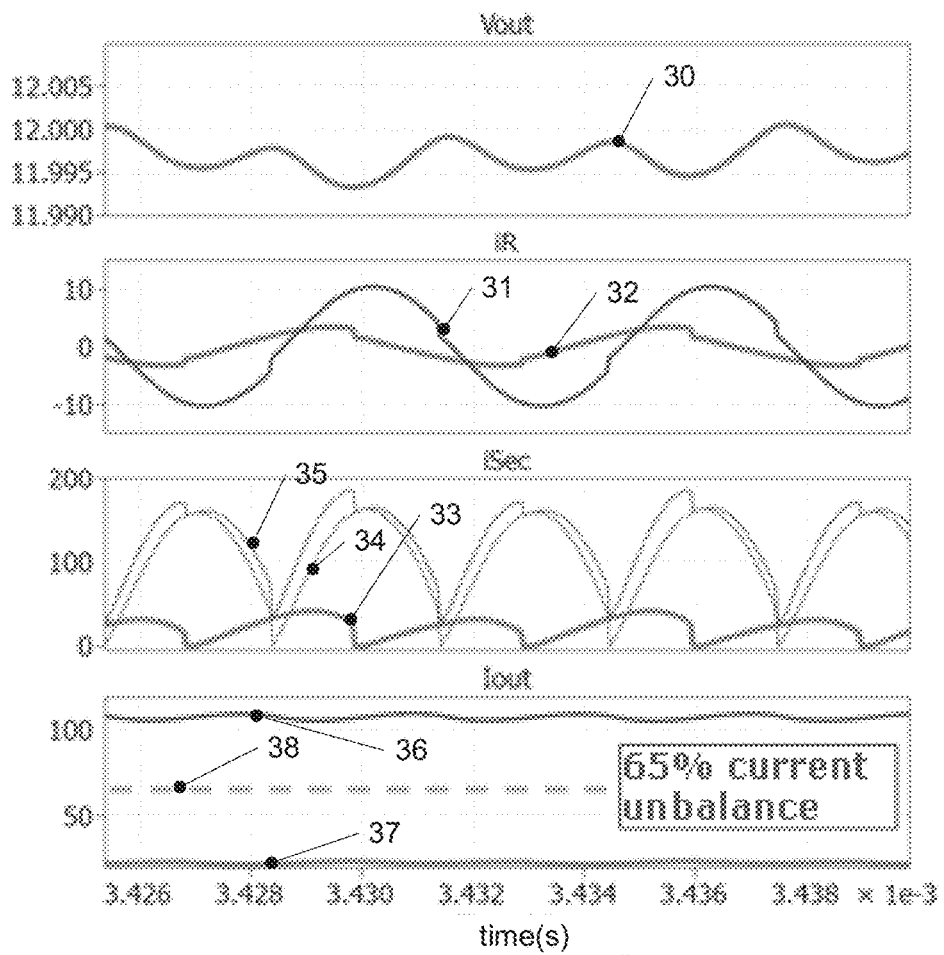
FIG. 3 illustrates an example for an interleaved case where a variation of 3% of parameters of the resonant tank (inductivity and capacitance) exists between resonant converters.
Figure 4:
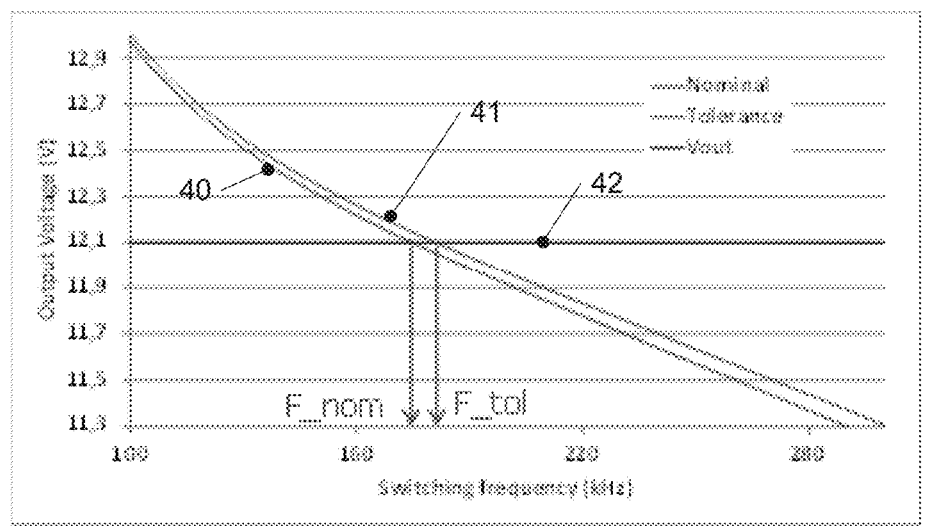
FIG. 4 illustrates a curve which shows a nominal behavior of the output voltage over a switching frequency used to control the resonant converters.

FIG. 3 illustrates an example for an interleaved case where a variation of 3% of parameters of the resonant tank (inductivity and capacitance) exists between first resonant converter 10A and second resonant converter 10B. A curve 30 in FIG. 3 illustrates the output voltage of the converter system. A curve 31 illustrates the resonant current in first resonant converter 10A, and a curve 32 a resonant current in second resonant converter 10B for this case. As can be seen, the resonant current imbalance is significantly higher than the 3% imbalance of the parameters. A curve 34 illustrates the secondary current of first resonant converter 10A in this case, and a curve 33 the secondary current for second resonant converter 10B. A curve 35 shows the total secondary current.

Furthermore, in FIG. 3 a curve 36 illustrates the output current by the first resonant converter, a curve 37 illustrates the output current by the second resonant converter 10B, whereas a curve 38 illustrates the nominal output current essentially corresponding to curve 24 of FIG. 2A. As can be seen, a significant current imbalance between the two resonant converters, 65% in the present simulation example, exists. It should be noted that FIGS. 2 and 3 are merely simulation examples to provide a better understanding and are not to be seen as limiting, as specific waveforms and magnitudes of signals may vary depending on the implementation of the respective resonant converter.

This imbalance is linked to the fact that another switching frequency would be necessary to maintain a same output voltage in case the resonant properties of the resonant tank of the resonant converter deviate from each other due to tolerances. For example, in FIG. 4 a curve 40 shows a nominal behavior of the output voltage over a switching frequency used to control a resonant converter, in particular switches at a primary side of the resonant converter. To obtain a desired output voltage marked by a line 42, a switching frequency f_nom is necessary. In case of a deviation due to the tolerances illustrated by a curve 41, a different switching frequency f_tol would be needed to be used to obtain the same output voltage.

By using a synchronous rectifier controller like synchronous rectifier controller 12 which detects an imbalance and reduces an on-time of a switch of a synchronous rectifier of a resonant converter carrying a greater part of the load, such an imbalance may be removed or mitigated in some embodiments.

This reducing of the on-time of a synchronous rectifier switch will now be discussed further referring to FIGS. 5A and 5B. For FIGS. 5A and 5B, a synchronous rectifier switch comprising a MOS switch 50 and a diode 51 coupled in parallel thereto is used as an example. Diode 51 may be an integrated or parasitic diode of MOS switch 50 or may be a dedicated diode provided in addition to MOS switch 50. Such diodes are sometimes also referred to as freewheeling diodes.

Figures 5A, 5B:
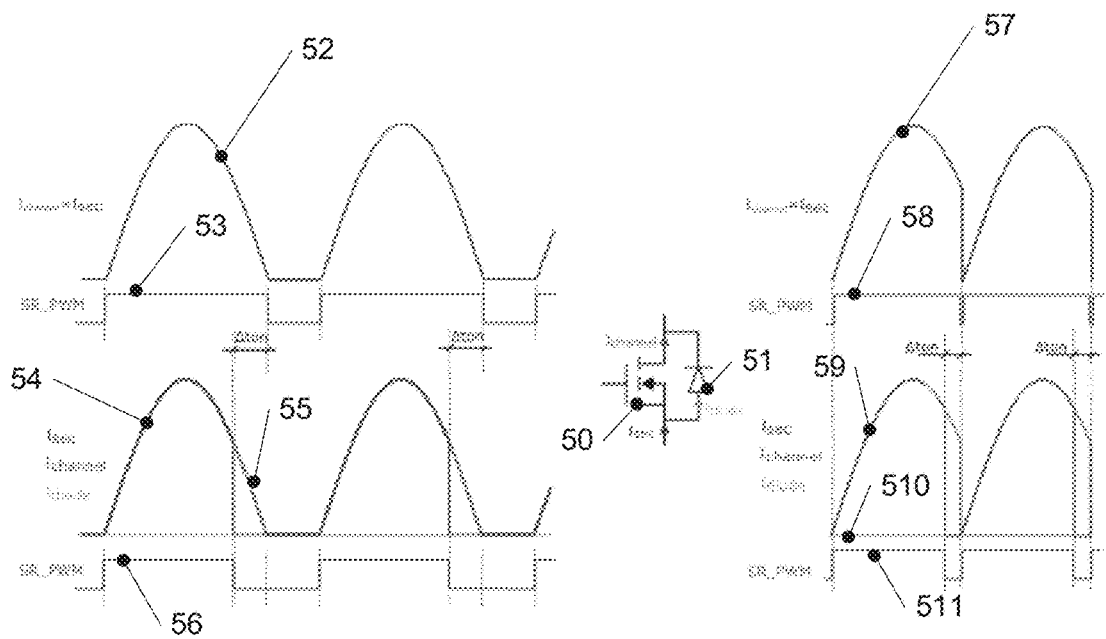
FIGS. 5A and 5B illustrate methods of reducing on-time of a synchronous rectifier switch.

FIG. 5A illustrates a case where a resonant converter is controlled by a control signal having a switching frequency below the resonance frequency of the resonant tank. A curve 52 illustrates the secondary current and a curve 53 illustrates an example control signal for a synchronous rectifier switch (to be applied to the gate terminal of MOS transistor 50) in a nominal case, i.e. a case where no deviations due to tolerances exist and all resonant converters in a system output the same current without further measures when controlled based on the same switching frequency. Here, an on-time of the switch (high level of curve 53) corresponds to half a resonant period of the resonant tank. Therefore, transistor 50 is closed providing a low ohmic connection between source and drain terminals during the complete half period, and the secondary current is essentially only conducted via MOS transistor 50 without significant current conduction via diode 51.

In case of an imbalance, as mentioned the on-time of a switch is reduced by a time ΔTon, as shown for a curve 56 in FIG. 5A. In this case, the secondary current during the on-time of transistor 50 is conducted via transistor 50 (curve 54), whereas during the remaining time where the transistor is opened is carried via diode 51 (curve 55). This increases losses and decreases the current output of the respective converter and may therefore contribute to reducing load imbalances.

FIG. 5B illustrates a case for a switching frequency above the resonant frequency. Here, there are no full half periods of the secondary current, as the next half period already begins before the previous one has ended, as shown in curve 57 in FIG. 5B. In the nominal case, there are only short times where the switch is opened, as illustrated by a curve 58 illustrating a switch control signal for transistor 50.

In case of a load imbalance, the on-time of a synchronous rectifier switch of the converter may be reduced, as shown by a switch control signal according to curve 511 of FIG. 5B. Here, the on-time compared to the nominal case of curve 58 is reduced by a time ΔTon. In this case, only during the on-time of the synchronous rectifier switch the secondary current is flowing through MOS transistor 50, as indicated by a curve 59. During the remaining time, current flows via diode 51, as indicated by a curve 510.

Figure 6:
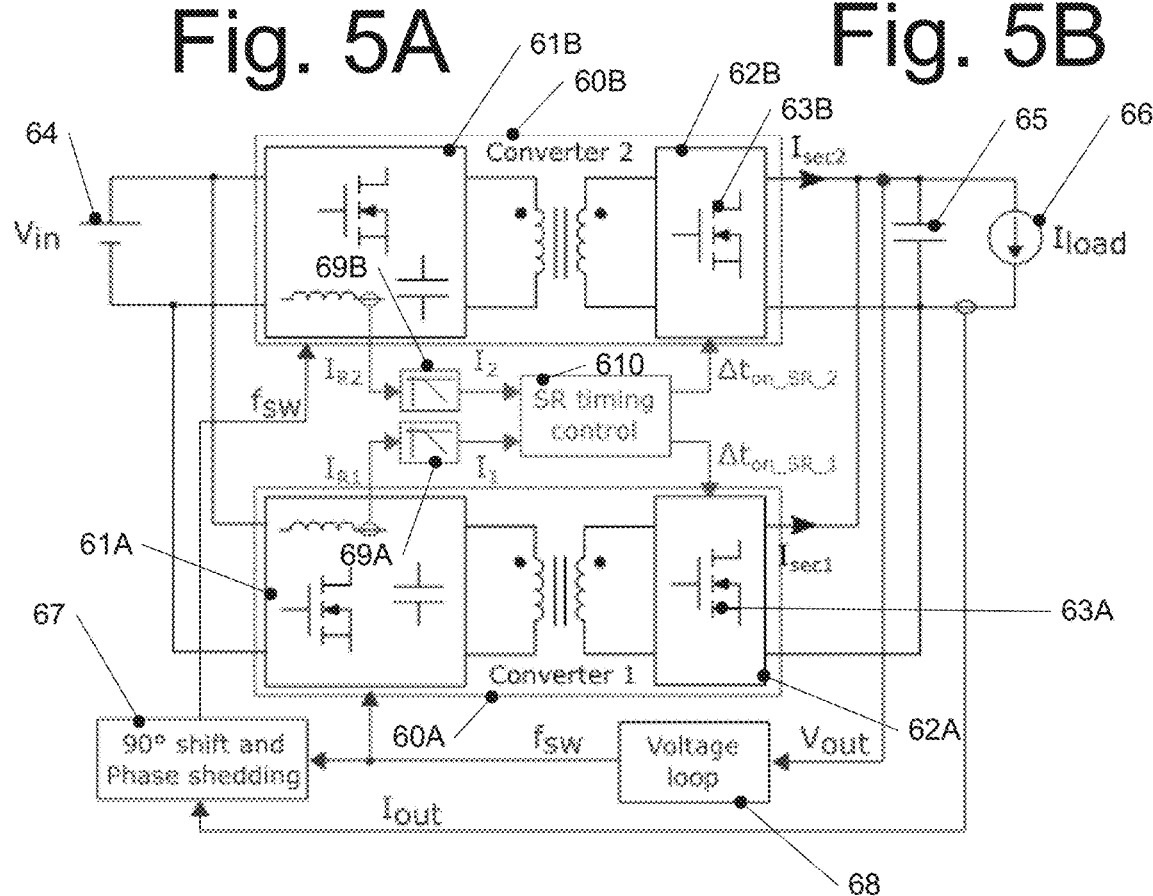
FIG. 6 is a schematic circuit diagram of a resonant converter system according to a further embodiment.

FIG. 6 is a schematic circuit diagram of a resonant converter system according to a further embodiment.

The embodiment of FIG. 6 comprises a first resonant converter 60A and a second resonant converter 60B. First resonant converter 60A comprises an input stage 61A and an output stage 62A coupled by a transformer as shown. Input stage 61A comprises a switch, symbolized by a transistor symbol in FIG. 6, and a resonant tank symbolized by an inductor and a capacitor as shown. Output stage 62A comprises a synchronous rectifier as symbolized by synchronous rectifier transistor switch 63A.

Likewise, second resonant converter 60B comprises an input stage 61B and an output stage 63B coupled by a transformer as shown which are designed as input stage 61A and output stage 62A, respectively, in the embodiment of FIG. 6. Input stages 61A, 61B are provided on a primary side of the respective transformer, and output stages 62A, 62B are provided on a secondary side.

Again, while two converters 60A, 60B are shown for sake of illustration, any number of converters may be used employing techniques discussed herein.

An input voltage Vin, represented by a battery 64, is provided to converters 60A, 60B, in particular to input stages 61A, 61B thereof. First converter 60A outputs a first secondary current $I_{sec1}$, and second converter 60B outputs a second secondary $I_{sec2}$. The first and second secondary currents $I_{sec1}$, $I_{sec2}$ are added and filtered by a filter 65 to provide a current $I_{load}$ to a load 66.

An output voltage Vout of the converter arrangement is provided to a voltage loop controller 68 which determines a switching frequency $f_{SW}$ for switches of input stages 61A, 61B to regulate the output voltage Vout to a predetermined value. The switching frequency $f_{SW}$ is provided directly to the input stage 61A of first converter 60A and is provided with a 90-degree phase shift by a phase shifter 67 to input stage 61B of second converter 60B.

Furthermore, phase shifter 67 receives the output current $I_{out}$ essentially corresponding to the current $I_{load}$. $I_{load}$ is used to designate the current demanded by the load and $I_{out}$ is the current measured by phase shifter 67, which are essentially the same. If $I_{out}$ is below a predetermined threshold, phase shifter 67 disables second converter 60B, for example by opening switches in input stage 61B, such that for light loads (output currents below the predetermined threshold) only first converter 60A outputs power. Therefore, the embodiment of FIG. 6 employs the already explained phase shedding technique.

In the embodiment of FIG. 6, (except for low loads, where the second converter 60B is effectively deactivated) the same switching frequency $f_{SW}$ is provided to first and second converters 60A, 60B with a 90-degree phase shift between them. This interleaving allows to reduce output current ripple. Therefore, the size of an output filter represented by capacitors 65 may be reduced compared to a case without interleaving in some embodiments.

Furthermore, to compensate for tolerances in resonant tanks of input stages 61A, 61B, in the embodiment of FIG. 6 a first resonant current $I_{R1}$ in a resonant tank of first resonant converter 60A and a second resonant current $I_{R2}$ in a resonant tank of second converter 60B are measured and provided to low pass filters 69A and 69B, respectively, to form filtered currents $I_1$, $I_2$. Filtered current $I_1$, $I_2$ are a measure of the load distribution between first and second resonant converters 60A and 60B and are an example for signals L1, L2 of FIG. 1. It should be noted that instead of measuring the resonant currents, other currents representative of the loads could be measured in other embodiments, for example secondary currents $I_{sec1}$, $I_{sec2}$. Currents $I_1$, $I_2$ are provided to a timing controller 610, which controls synchronous rectifier switches 63A, 63B. In particular, on-times of synchronous rectifier switches are reduced for a controller bearing a larger load compared to a nominal case. For example, if $I_1 > I_2$ this means that first resonant converter 60A bears a larger load, and the on-time of synchronous rectifier switches 62A is reduced by a time ΔTon_R_1. Conversely, if $I_2 > I_1$, the on-time of synchronous rectifier switches 63B is reduced by adjusting ΔTon_R_2 accordingly. In this way, load balancing may be obtained, such that both resonant converters 60A, 60B output the same output power and, with the same output voltage as regulated by the voltage loop, the same average output current.

The reduction of on-time of switches may be as explained with reference to FIGS. 5A and 5B and as explained later in more detail referring to FIGS. 9-13.

Figure 7:
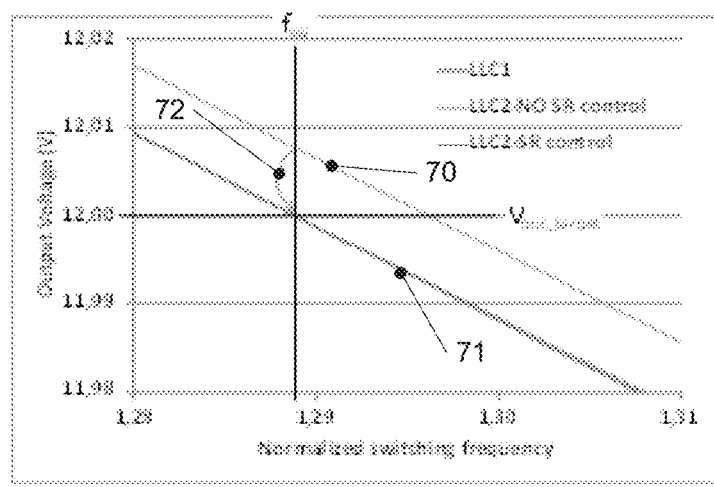
FIG. 7 illustrates a plot diagram showing the effect of load balancing.

FIG. 7 illustrates the effect of such a load balancing. In the example of FIG. 7, at switching frequency $f_{SW}$ a target output voltage Vout_target of 12V is assumed. A first resonant converter (for example 60A of FIG. 6) has an output voltage dependency on the switching frequency as represented by curve 71. Without the control by controller 610 of FIG. 6, a second resonant converter (for example 60B) would have a characteristic as illustrated in FIG. 7, which would lead to load imbalances as explained with reference to FIG. 3. By the control, as indicated by an arrow 72, curve 70 is essentially shifted to curve 71, such that both converters output the target output voltage Vout_target at switching frequency $f_{SW}$, and the load may be equally shared between the converters.

Figure 8:
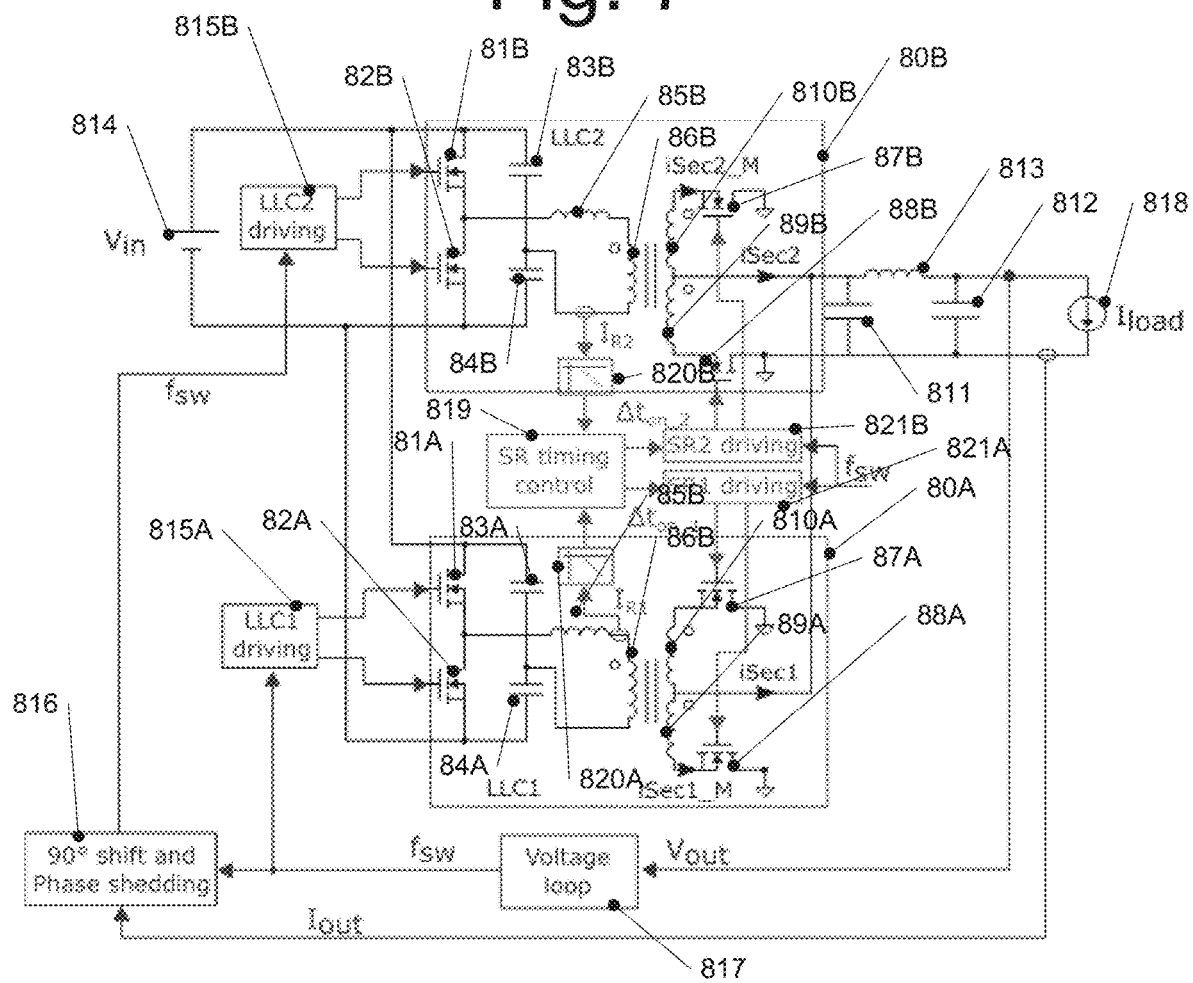
FIG. 8 illustrates a schematic circuit diagram of a resonant converter system according to a further embodiment.

FIG. 8 illustrates a resonant converter system according to a further embodiment. The system of FIG. 8 comprises a first resonant LLC converter 80A and a second resonant LLC converter 80B. Again, the number of two converters is only for illustration purposes, and more than two converters may be provided.

First resonant converter 80A comprises a resonant tank having capacitors 83A, 84A and inductors 85A, 86A, inductor 86A being an inductor of a transformer of first resonant converter 60A. An output voltage of first LLC converter 80A is controlled by switches 81A, 82A, which are coupled in parallel to capacitors 83A, 84A as shown.

On a secondary side of the transformer of first LLC converter 80A, inductors 89A, 810A forming secondary windings of the transformer are provided and being coupled to synchronous rectifier switches 87A, 88A.

Second LLC converter 80B is configured corresponding to first LLC converter 80A, where the corresponding elements bear the same reference numerals with the "A" replaced by "B". Therefore, second LLC converter 80B will not be described in detail, and the above explanations for first LLC converter 80A also apply here.

An input voltage Vin from an input voltage source 814 (represented by a battery here, although it may be any DC input voltage source) is provided to LLC converters 80A, 80B. It should be noted that in case of an AC voltage source like a mains power, a rectifier (not shown in FIG. 8 but explained when referring to FIG. 13) may be provided to supply a DC input voltage to converters 80A, 80B.

First LLC converter 80A outputs a first secondary current $I_{sec1}$, and second LLC converter 80B outputs a second secondary current $I_{sec2}$, which are added and filtered by an output filter comprising capacitors 811, 812 and an inductor 813 to provide an output current $I_{out}$ to a load 818, through which then a corresponding load current $I_{load}$ flows.

An output voltage Vout is provided to a voltage loop controller 817, which may compare the output voltage Vout to a reference value and adjust a switching frequency $f_{SW}$ to regulate the output voltage Vout to a predetermined value. The switching frequency $f_{SW}$ is provided to a first switch driver 815A to control switches 81A, 82A of first LLC converter 80A and via 90-degree phase shifter 816 to a second switch driver 815B driving switches 81B, 82B of second LLC converter 80B. Furthermore, the output current $I_{out}$ is provided to phase shifter 816, and if the output current $I_{out}$ is below a predetermined threshold value indicating a light load, second LLC converter 80B is deactivated, for example, by opening both switches 81B, 82B. The operation of voltage loop controller 807 and phase shifter 816 corresponds to the operation already explained with reference to FIGS. 5A and 5B for voltage loop controller 68 and phase shifter 67.

Furthermore, in the embodiment a current $I_{R1}$ flowing through the resonant tank, in particular through inductors 85A, 86A, of first LLC converter 80A is low pass filtered by a low pass filter 820 and provided to a synchronous rectifier timing controller 819. Likewise, a current $I_{R2}$ flowing through the resonant tank of second LLC converter 80B is low pass filtered by a low pass filter 820B and also provided to synchronous rectifier timing controller 819. Instead of measuring a current in the resonant tank, for example also the secondary current may be measured and used as an input for timing controller 819.

Based on the low pass filtered currents $I_{R1}$, $I_{R2}$, timing controller 819 controls a first switch driver 821A and a second switch driver 821B controlling synchronous rectifier switches 87A, 88A of first LLC converter 80A and synchronous rectifier switches 87B, 88B of second LLC converter 80B, respectively. Switch drivers 821A, 821B are also provided with the switching frequency $f_{SW}$. Switch drivers 821A, 821B control the respective switches 87A, 87B and 88A, 88B with a signal having a frequency corresponding to the switching frequency $f_{SW}$. In case of a load imbalance, the on-time of switches is reduced by $\Delta Ton\_1$ or $\Delta Ton\_2$, respectively. In particular, in case filtered $I_{R1}$ is greater than filtered $I_{R2}$, compared to a nominal case $\Delta Ton\_1$ is increased to reduce the on-time of switches 87A, 88A, and if filtered $I_{R2}$ is greater than filtered $I_{R1}$, $\Delta Ton\_2$ is increased in some embodiments. In this way, as has been explained above, load balancing may be provided such that both LLC converters 80A, 80B on average output the same secondary current.

Next, an example operation of timing controller 819 of FIG. 8, timing controller 610 or controller 12 of FIG. 1 will be explained referring to FIGS. 9 to 13.

Figure 9:
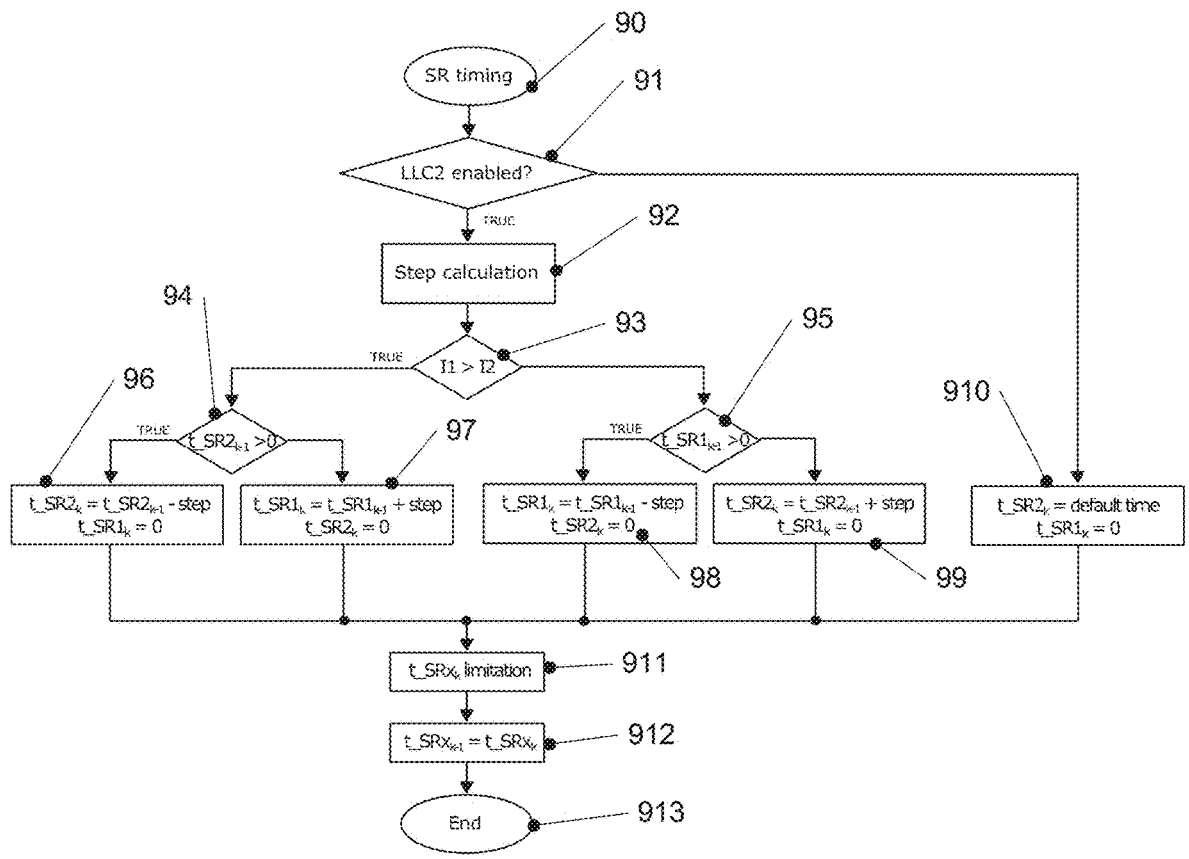
FIG. 9 illustrates a flow chart of a regulation method according to an embodiment.

FIG. 9 is a flow chart of a regulation method according to an embodiment. The method of FIG. 9 is only an example how a control of an on-time of synchronous rectifier switches may be performed, and other control schemes, for example a PID control (Proportional Integral Derivative) may also be used. Therefore, FIG. 9 gives merely a non-limiting example for a control implementation. The method of FIG. 9 may be repeatedly executed in fixed or variable intervals, e.g. according to a clock signal.

At 90 in FIG. 9, the timing control starts. At 91, it is checked if the second converter is enabled or disabled in light load conditions. In case the second converter is disabled, at 910 the on-time reduction for the first converter $T\_SR1_K$ is set to zero, i.e. the first converter operates without on-time reduction (as with the second converter disabled no load balancing is needed), and the on-time reduction for the second converter $T\_SR2_K$ is set to the default time that corresponds to a reduction of the on-time to zero or a last on-time reduction used when both converters were active, or a value based on simulation (in case the second converter is disabled, the synchronous rectifier switches of the second converter are always in open in some embodiments). The index k is an index which is increased with every run of the method of FIG. 9 in the controller.

In case the second converter is enabled at 91, i.e. both converters are operated, at 92 a step calculation for a step size step according to which an on-time is to be reduced is calculated. The step size may vary from one execution of the method of FIG. 9 to the next.

At 93, it is checked if I1 is greater than I2, i.e. the first converter bears a larger load than the second converter. If this is the case, at 94, it is checked if the on-time of the second converter has been previously reduced, i.e. $T\_SR2_{k-1}$ (the on-time reduction for the second converter in a previous run) is greater than zero. If this is the case, at 96 the on-time reduction of the second converter is decreased by the step size step calculated at 92, and the on-time reduction of the first converter is set to zero. In other words, in this case a previous reduction of the on-time for the second converter is reduced to increase the on-time again.

If the on-time of the second converter has not been reduced previously, at 97 the on-time reduction for the first converter is increased by the step size step, and the on-time reduction for the second converter is set to zero.

At 95, 98 and 99, essentially the same operations are performed as at 94, 96 and 97, with the role of the first and second converters being reversed, as in this case I1 does not exceed I2, i.e. the load of the second converter is greater (or equal to) the load of the first converter. Correspondingly, at 95 it is checked if the on-time of the first converter has been previously reduced, i.e. if $T\_SR1_{k-1}>0$. If this is the case, at 98 this on-time reduction is reduced, i.e. $TSR1_K=T\_SR1_{K-1}$-step. The on-time for the second converter $T\_SR2_K$ is set to zero.

If the on-time of the first converter has not been reduced previously, in this case at 99 the on-time of the second converter is decreased ($T\_SR2_K=T\_SR2_{k-1}$+step), and the on-time reduction of the first converter is set to zero ($T\_SR1_k=0$).

At 911, a limitation of the on-time reduction may be performed, i.e. it is checked if the on-time reduction is too big. For example, at 911 it may be checked if the calculated values for the on-time reduction are adequate for a safe operation of the converter. For example, a calculated time longer than a nominal value will not be applied and replaced by the nominal value. At 912, the determined values for on-time reduction are saved for a next run of the method of FIG. 9. At 913, the control ends.

Figure 10:
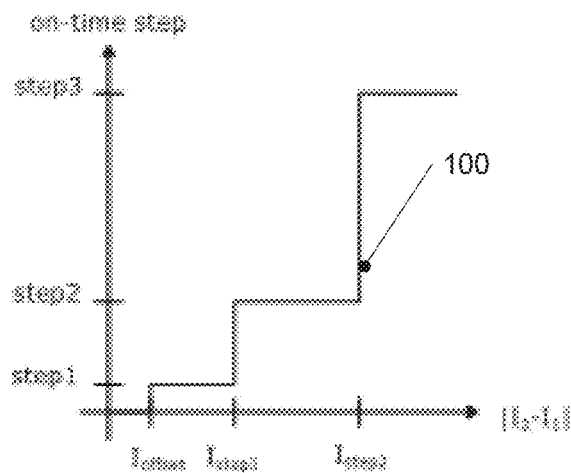
FIG. 10 illustrates a step calculation which depends on a difference between two converter currents.

The step calculation of the value step at 92 may be made depending on a difference between I2 and I1. This is shown in FIG. 10. FIG. 10 illustrates the calculation of step size according to a curve 100. Depending on the absolute difference $|I_2-I_1|$ exceeding thresholds ($I_{offset}$, $I_{step1}$, $I_{step2}$) different step sizes are used. $I_{offset}$ is a threshold value below which the loads are regarded to be as sufficiently equal. The offset in FIG. 10 $I_{offset}$ may also compensate for a current offset between the converters.

The larger the difference between the currents $I_1$ and $I_2$ is, the larger the step size step is, such that a fast convergence may be obtained in some embodiments. Nevertheless, in other embodiments, constant step sizes may be used.

In FIG. 5A, an example was shown where the on-time reduction was at the end of the on-time. However, an on-time reduction may also be performed at the start of an on-time or both at the start and the end of the on-time of a synchronous rectifier switch, as will now be explained referring to FIGS. 11A-11D and 12A-12D. Where the reduction of on-time is applied may have an influence on generated extra losses due to diode conduction and/or on gain modification of the resonant converters in some embodiments.

In FIGS. 11A-11D, examples are shown for on-time reduction if the switching frequency $f_{SW}$ is below the resonance frequency of the resonant tank of the converter. FIGS. 11A and 11B correspond to the examples already shown in FIGS. 5A and 5B. In particular, curves 121 and 122 in FIG. 11A show a nominal case where the on-time corresponds to a half period of the secondary current, corresponding to curves 52 and 53 of FIG. 5A. FIG. 11B illustrates a case where an on-time of a synchronous rectifier switch is shortened and at an end of the on-time compared to FIG. 11A, is illustrated in curve 125. Curve 123 shows the current conducted via the switch itself (e.g. a transistor or channel of transistor 50 of FIG. 5) in this case, and curve 124 illustrates current conducting via a diode (e.g. 51 of FIG. 5). Curves 123-125 correspond to curves 54-56 in FIG. 5A.

FIGS. 11C and 11D show further possibilities for reducing the on-time of a synchronous rectifier switch. In case of FIG. 11C, the on-time of the synchronous rectifier switch is reduced at the beginning of a period where the switch is closed, i.e. the switch is closed later than in case of FIG. 11A, as shown by a switch control signal 128 in FIG. 11C. In this case, during the time where the switch is still open, as illustrated by curve 127 current is conducted via a diode (for example diode 51 of FIG. 5), and when the switch is then closed according to curve 126 current is conducted through the switch itself.

FIG. 11D illustrates an example where the on-time is reduced both at the beginning and the end of the on-time, as shown by a switch control signal 1211 in FIG. 11D. In FIG. 11D, again during the on-time of the switch current is flowing through the switch itself (for example transistor channel) as illustrated by curve 129, and during the off-time as illustrated by a curve 1210, current is flowing through a diode. Therefore, in this case current is flowing through the diode both in the beginning and at the end of the resonant period.

FIGS. 12A-12D show examples corresponding to FIGS. 11A-11D for a case where the switching frequency $f_{SW}$ is above the resonance frequency of the resonant tank. FIGS. 12A and 12B correspond to the cases shown in FIG. 5B, FIG. 12A showing a nominal case where curves 130 and 131 correspond to curves 57 and 58 of FIG. 5B. FIG. 12B shows a case where the on-time of the synchronous rectifier switch is reduced at an end of the on-time, where curve 132 corresponds to curve 59 of FIG. 5B, curve 133 corresponds to curve 510 of FIG. 5B and curve 134 corresponds to curve 511 of FIG. 5B.

FIG. 12C illustrates a curve where the on-time of the switch is reduced at a beginning of the on-time, corresponding to a switch control signal 137. In other words, the synchronous rectifier switch in this case closes later than in the nominal case of FIG. 12A. In FIG. 12C, a curve 135 illustrates a current flowing through the switch itself (for example transistor channel), whereas a curve 136 illustrates current flowing through a diode in this case.

FIG. 12D illustrates a case where the on-time reduction occurs both at the beginning and at the end of a switched-on period of the switch, as illustrated by a switch control signal 1310 compared to signal 131 of FIG. 12A. A curve 138 illustrates current flowing through the switch itself (for example transistor channel), and a curve 139 illustrates a current flowing through a diode.

As can be seen from FIGS. 11A-11D and 12A-12D, various possibilities for reducing the on-time exist.

Resonant converters existence as discussed herein may be used in various power supplies, for example server systems or telecommunication systems, to provide a load with power. An example for such an application is shown in FIG. 13.

Figure 13:
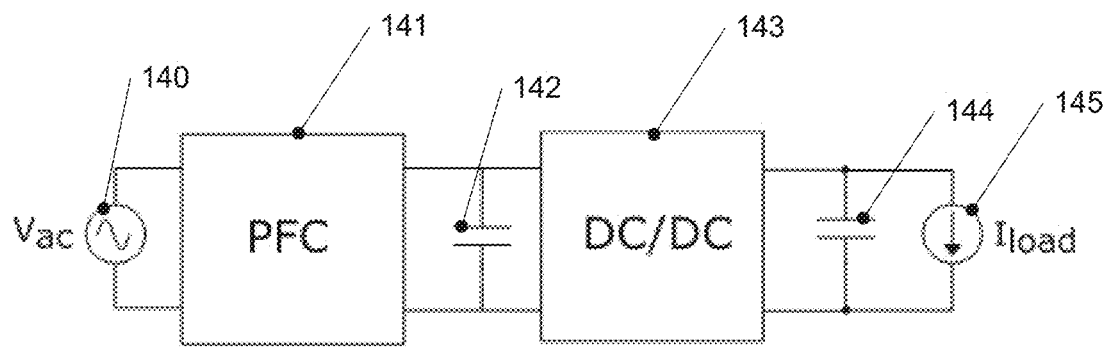
FIG. 13 illustrates a block diagram of an alternating current source coupled to a power factor controller.

In the example of FIG. 13, an alternating current source 140, for example a mains power, is coupled to a power factor controller (PFC) 141. In the power factor controller, the so-called power factor is increased, i.e. the ratio of true power divided by reactive power. Furthermore, an active rectification is performed. A filter 142, represented by a capacitor, filters the output of power factor controller 141 and provides the filtered voltage to a DC/DC converter 143. In the embodiment of FIG. 13, DC/DC converter 143 comprises a resonant converter system employing techniques as discussed herein, e.g. the system of FIG. 1, 6 or 8. The output of DC/DC converter 143 is filtered by a filter 144, again represented by a capacitor, and provided to a load 145.

Figure 14A:
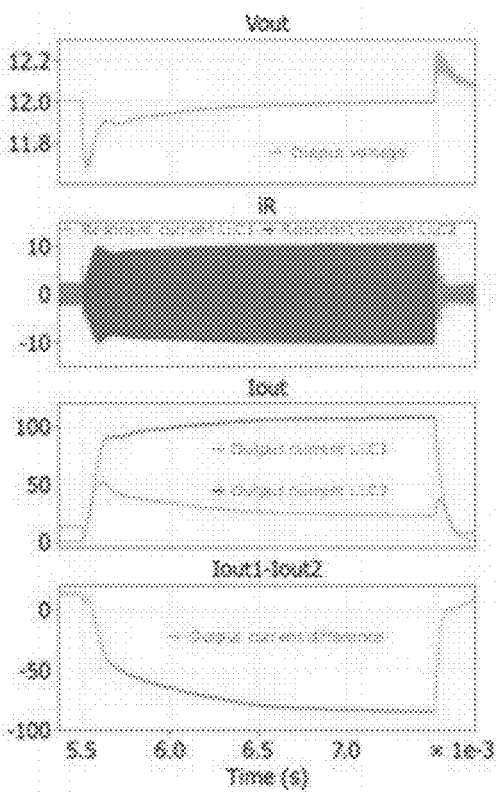
FIGS. 14A and 14B illustrate simulation results illustrating effects of techniques for a system comprising two converters similar to the one shown in FIG. 8.
Figure 14B:
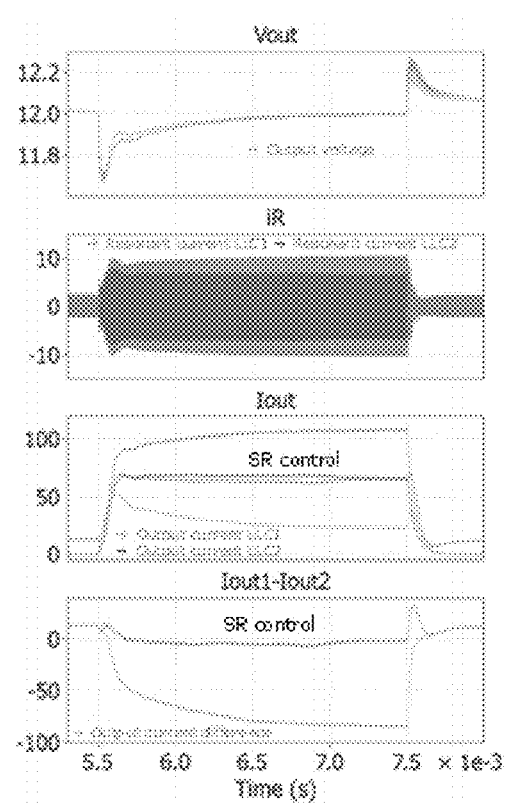

FIGS. 14A and 14B illustrate simulation results illustrating effects of techniques discussed herein for a system comprising two converters similar to the one shown in FIG. 8. FIG. 14A illustrates output voltage Vout, resonant currents iR of both converters, output currents $I_{out}$ of both converters and a difference in output currents $I_{out1}-I_{out2}$ for a load step between 10% and 100% load without techniques for regulating on-times of synchronous rectifier switches as discussed herein. As seen in particular from the difference in output currents, where there is almost no current sharing between two converters, and the converter with higher gain outputs most of the current. In fact, in the simulation example of FIG. 14A, the converter with higher gain outputs most of the current, and a 61% unbalance in the output currents is obtained with only a 3% variation of parameter of the resonant tank. In FIG. 14B, additionally to the output currents of the unbalanced case of FIG. 14A, output currents for a case where the synchronous rectifier switch control as discussed above is employed. These are labeled with "SR control" in FIG. 14B. As can be seen, the current in balance is reduced almost to zero in this case, while essentially maintaining the same output voltage.

Figure 15:
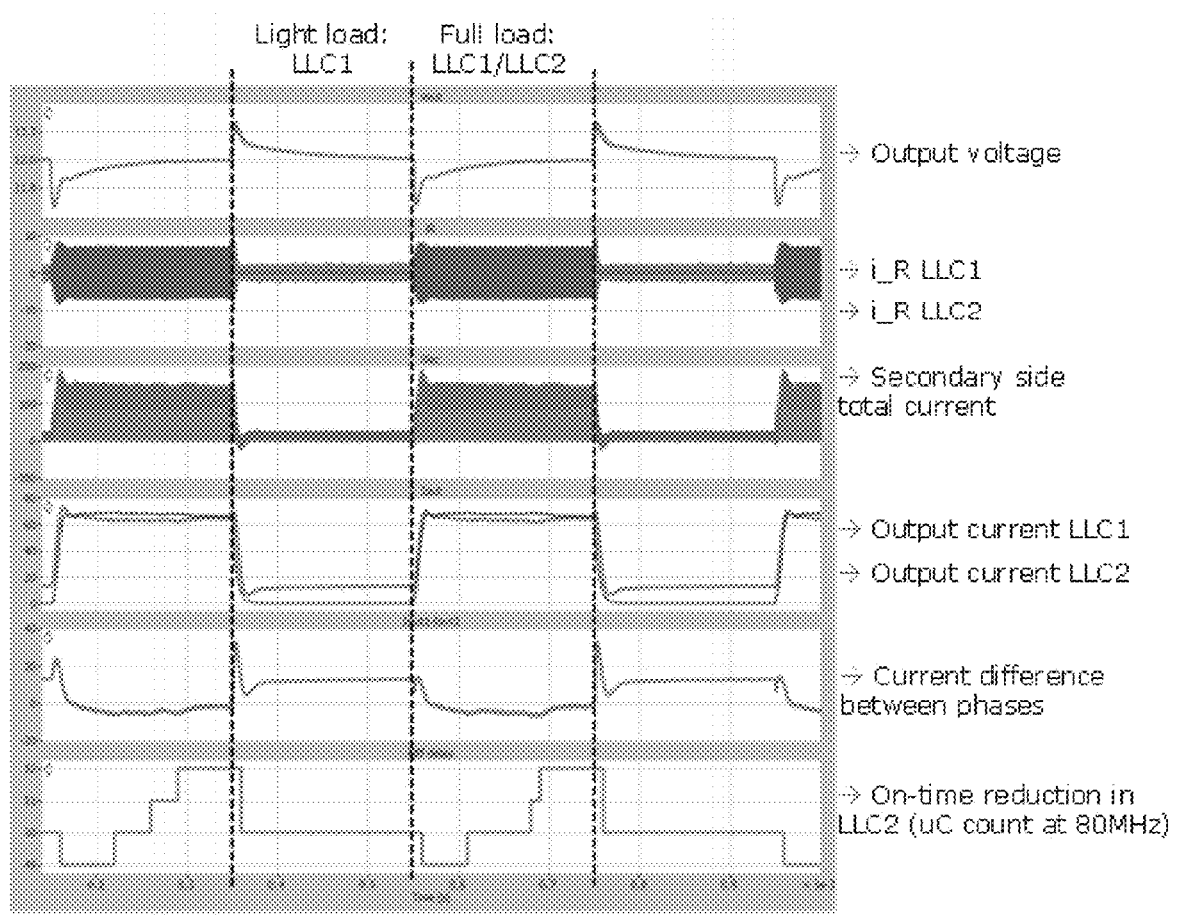
FIG. 15 illustrates a further simulation example illustrating the system behavior over time for two LLC converters.
Figure 16:
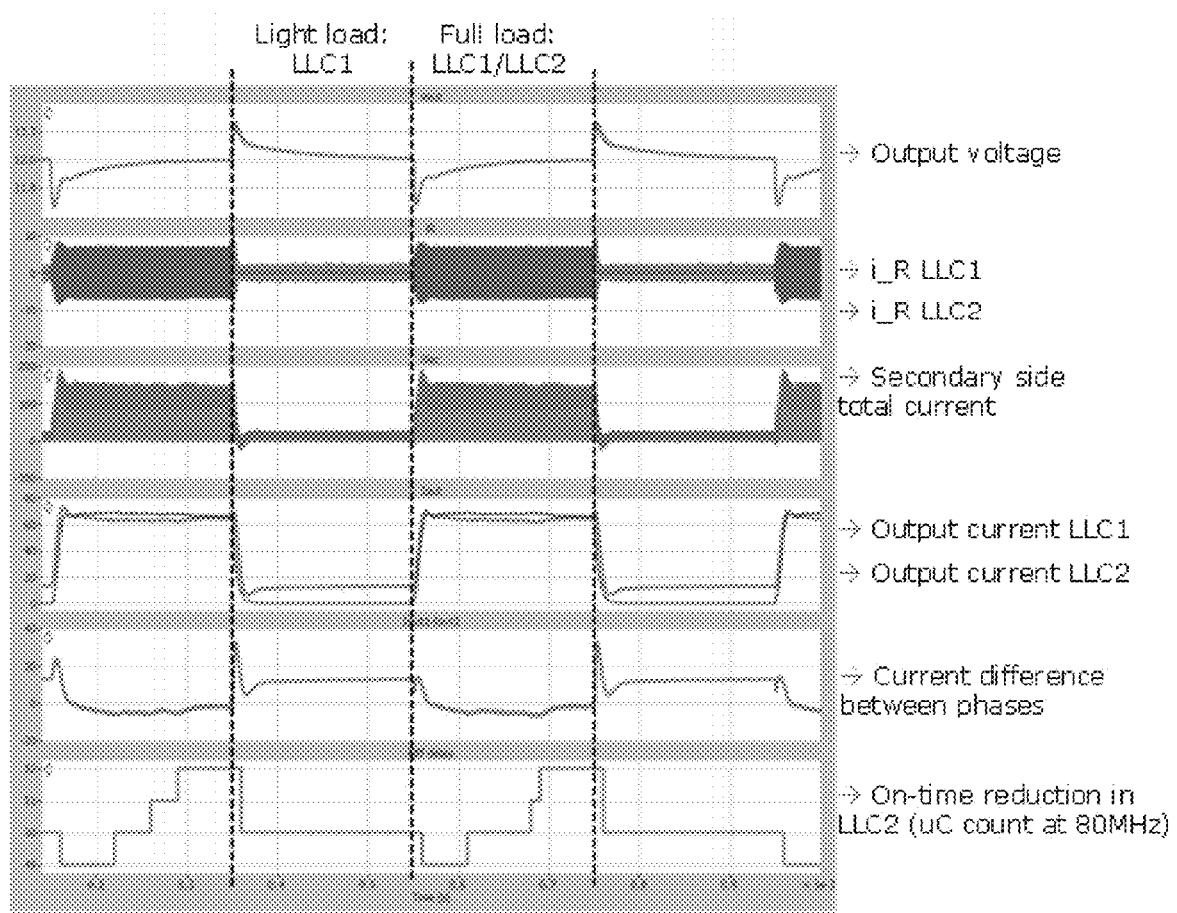

FIG. 15 shows a further simulation example illustrating the system behavior over time for two LLC converters (LLC1 and LLC2). FIG. 15 shows transitions between light load conditions where only a first resonant converter (LLC1) is active and a second full load condition where both converters (LLC1 and LLC2) are active. Responsive to a current difference between the "phases", i.e. between LLC1 and LLC2, an on-time reduction of LLC2 is performed, with an updating frequency—of 1 kHz. The offset current of the control scheme of FIGS. 9 and 10 in this case was set to 5 A, such that the output currents are regulated to be equal within 5 A.

In other words, for the simulation of FIG. 15, the control scheme illustrated in FIGS. 9 and 10 was applied.

Apart from this current sharing, the waveform shows the interleaving operation by applying a same switching frequency to both converters with corresponding phase shift.

As already discussed herein, the techniques described may be applied both to the above resonance and under resonance switching frequencies operating the converter. The reduction necessary may depend on whether the converters are operated above resonance or under resonance. In some embodiments, the conductions losses may depend on whether the on-time reduction takes place at the beginning of the closing of the transistor, at the end of the closing of the transistor or both (see FIGS. 11A-11D and 12A-12D). The losses may also depend on output voltage. An example is shown in the following table:

TABLE 1

| | | 380 V | | | 410 V | | |
|---|---|---|---|---|---|---|---|
| Conduction losses SR LLC2 | | 100% on | 60% on-40% off | 100% off | 100% on | 60% on-40% off | 100% off |
| Offset in current | 1 A (0.8%) | 8.5 W | 6.5 W | 4.6 W | 5.7 W | 9.8 W | 19 W |
| difference (% over | 5 A (3.8%) | 7.5 W | 6.5 W | 5 W | 6 W | 10.5 W | 19.3 W |
| the total current) | 10 A (7.7%) | 6.9 W | 6.5 W | 5.5 W | 6.2 W | 11 W | 19.5 W |

Table 1 shows losses in a resonant converter (LLC2) where the on-time is reduced for two different output voltages (380V and 410V) and for three different current offsets between the converters with the regulation as discussed herein (1A, 5A and 10A). For each case, losses for the current reduction being at the beginning of the closed time (100% on), distributed between beginning and end of closed time (60% at the beginning, 40% at the end, column 60% on—40% off) and for the case where the complete on-time reduction is performed at the end (100% off). As can be seen in this example, for 380V losses are highest for reduction at the beginning, whereas for 410V losses are highest for reduction at the end. The different losses may also correspond to different reduction-times of the closed time of the switch. For example, a reduction of 600 ns may be required in case the time is applied at the beginning of the on-time of the switch in under resonance, but only 325 ns if it is applied at the end. Therefore, depending on the requirements and implementations, the reduction in on-time may be applied at the beginning, at the end or both, as explained.

The following Examples are example embodiment.

Example 1

A controller, comprising:
a plurality of inputs configured to receive signals indicative of a load condition of a plurality of resonant converters,
a plurality of outputs configured to output control signals controlling synchronous rectifier switches of the plurality of resonant converters, and
a control circuit configured to reduce an on-time of a synchronous rectifier switch of a first converter of the plurality of resonant converters having a higher load than at least one second converter of the plurality of resonant converters via the respective control signal compared to a nominal case where synchronous rectifier switches of all converters have equal on-times.

Example 2

The controller of example 1, wherein the control circuit is configured to increase the on-time after the reduction up to an on-time in the nominal case if the load of the first converter is lower than the load of the second converter after reducing the on-time.

Example 3

The controller of example 1, wherein the control circuit is configured to determine an amount of on-time reduction based on a comparison between a difference between loads of the plurality of converters with at least one threshold value.

Example 4

The controller of example 1, wherein the control circuit is configured to reduce the on-time at the beginning of the on-time, at the end of the on-time or both.

Example 5

The controller of example 1, wherein the controller is configured to receive signals indicative of a current flowing in resonant tanks of the plurality of converters at the plurality of inputs.

Example 6

The controller of example 1, further comprising filter circuits coupled to the plurality of inputs configured to filter the signals indicative of the load.

Example 7

The controller of example 6, wherein the plurality of filters comprises low pass filters.

Example 8

A system, comprising:
a plurality of resonant converters, at least one of the plurality of resonant converters including a synchronous rectifier circuit, and
a controller as defined in any one of examples 1-7 coupled to the plurality of converters.

Example 9

The system of example 8, wherein the plurality of resonant converters comprise LLC converters.

Example 10

The systems of example 8, further comprising a voltage regulation loop configured to control a switching frequency of input switches of the plurality of resonant converters based on an output voltage of the system.

Example 11

The system of example 10, wherein the voltage regulation loop is configured to control the plurality of converters with phase offset control signals.

Example 12

The system of example 8, wherein the system is configured to deactivate one or more of the plurality of resonant converters in case an output current of the system is below a predetermined threshold.

Example 13

A method, comprising:
receiving information indicative of a load distribution between a plurality of resonant converters, and
reducing an on-time of a synchronous rectifier switch of a first resonant converter of the plurality of resonant converters compared to a nominal case where an on-time of synchronous rectifier switches are equal in all of the plurality of resonant converters in response to detecting a load imbalance based on the information.

Example 14

The method of example 13, wherein the method comprises comparing a first current of the first converter of the plurality of resonant converters with a second current of a second converter of the plurality of resonant converters, and reducing the on-time depending on a difference between the first resonator current and the second resonator current.

Example 15

The method of example 14, further comprising determining an amount of on-time reduction depending on the difference between the first current and the second current.

Example 16

The method of examples 13, wherein reducing the on-time comprises one of reducing the on-time at the beginning of the on-time, reducing the on-time at an end of the on-time, or reducing the on-time both at the beginning and end of the on-time.

Example 17

The method of example 13, further comprising increasing the on-time of the synchronous rectifier switch of the first converter after the reducing in response to a change of the information.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A controller, comprising:
a plurality of inputs configured to receive signals indicative of a load condition of a plurality of resonant converters;
a plurality of outputs configured to output control signals controlling synchronous rectifier switches on a secondary side of the plurality of resonant converters; and
a control circuit configured to reduce a gain of a first resonant converter of the plurality of resonant converters having a load higher than a load of at least one second resonant converter of the plurality of resonant converters via respective control signals compared to a nominal case where synchronous rectifier switches on secondary sides of all of the plurality of resonant converters have equal on-times, by reducing an on-time of a synchronous rectifier switch on a secondary side of the first resonant converter, independent of a control signal for controlling an input stage which is located on a primary side of the first resonant converter and coupled to the synchronous rectifier switch with reduced on-time through a transformer, such that current is conducted by a diode in parallel to the synchronous rectifier switch on the secondary side of the first resonant converter.

2. The controller of claim 1, wherein the control circuit is configured to increase the on-time of the synchronous rectifier switch of the first resonant converter after the reduction up to the on-time in the nominal case if the load of the first resonant converter is lower than the load of the at least one second resonant converter after reducing the on-time.

3. The controller of claim 1, wherein the control circuit is configured to determine an amount of on-time reduction based on a comparison between a difference between loads of the plurality of resonant converters with at least one threshold value.

4. The controller of claim 1, wherein the control circuit is configured to reduce the on-time of the synchronous rectifier switch of the first resonant converter at a beginning of the on-time, at an end of the on-time or both at the beginning and at the end of the on-time.

5. The controller of claim 1, wherein the controller is configured to receive signals indicative of a current flowing in resonant tanks of the plurality of resonant converters at the plurality of inputs.

6. The controller of claim 1, further comprising filter circuits coupled to the plurality of inputs and configured to filter the signals indicative of the load condition.

7. The controller of claim 6, wherein the plurality of filters comprises low pass filters.

8. A system, comprising:
a plurality of resonant converters, at least one of the plurality of resonant converters including a synchronous rectifier circuit on a secondary side of the at least one of the plurality of resonant converters; and
a controller coupled to the plurality of resonant converters, the controller comprising:
a plurality of inputs configured to receive signals indicative of a load condition of the plurality of resonant converters;

a plurality of outputs configured to output control signals controlling synchronous rectifier switches on secondary sides of the plurality of resonant converters; and a control circuit configured to reduce a gain of a first resonant converter of the plurality of resonant converters having a load higher than a load of at least one second resonant converter of the plurality of resonant converters via respective control signals compared to a nominal case where synchronous rectifier switches on secondary sides of all of the plurality of resonant converters have equal on-times, by reducing an on-time of a synchronous rectifier switch on a secondary side of the first resonant converter, independent of a control signal for controlling an input stage which is located on a primary side of the first resonant converter and coupled to the synchronous rectifier switch with reduced on-time through a transformer, such that current is conducted by a diode in parallel to the synchronous rectifier switch on the secondary side of the first resonant converter.

9. The system of claim 8, wherein the plurality of resonant converters comprises LLC converters.

10. The system of claim 8, further comprising a voltage regulation loop configured to control a switching frequency of input switches on the primary sides of the plurality of resonant converters based on an output voltage of the system.

11. The system of claim 10, wherein the voltage regulation loop is configured to control the plurality of resonant converters with phase offset control signals.

12. The system of claim 8, wherein the system is configured to deactivate one or more of the plurality of resonant converters in case an output current of the system is below a predetermined threshold.

13. The system of claim 8, wherein the control circuit is configured to increase the on-time of the first resonant converter, after reducing the on-time of the first resonant converter, up to an on-time in the nominal case if the load of the first resonant converter is lower than the load of the at least one second resonant converter after reducing the on-time of the first resonant converter.

14. The system of claim 8, wherein the control circuit is configured to determine an amount of on-time reduction for the first resonant converter based on a comparison between a difference between loads of the plurality of resonant converters with at least one threshold value.

15. The system of claim 8, wherein the control circuit is configured to reduce the on-time of the first resonant converter at a beginning of the on-time, at an end of the on-time or both at the beginning and at the end of the on-time.

16. A method, comprising:
receiving information indicative of a load distribution between a plurality of resonant converters; and reducing an a gain of a first resonant converter of the plurality of resonant converters compared to a nominal case where an on-time of synchronous rectifier switches are equal on secondary sides in all of the plurality of resonant converters in response to detecting a load imbalance based on the information, by reducing an on-time of a synchronous rectifier switch on a secondary side of the first resonant converter, independent of a control signal for controlling an input stage which is located on a primary side of the first resonant converter and coupled to the synchronous rectifier switch with reduced on-time through a transformer, such that current is conducted by a diode in parallel to the synchronous rectifier switch on the secondary side of the first resonant converter.

17. The method of claim 16, wherein reducing the on-time comprises:
comparing a first current of the first resonant converter with a second current of a second resonant converter of the plurality of resonant converters; and reducing the on-time depending on a difference between the first current and the second current.

18. The method of claim 17, further comprising:
determining an amount of on-time reduction depending on the difference between the first current and the second current.

19. The method of claim 16, wherein reducing the on-time comprises:
reducing the on-time of the first resonant converter at a beginning of the on-time, reducing the on-time at an end of the on-time, or reducing the on-time both at the beginning and at the end of the on-time.

20. The method of claim 16, further comprising:
increasing the on-time of the synchronous rectifier switch of the first resonant converter after the reducing in response to a change of the information.

\* \* \* \* \*

UNITED STATES PATENT AND TRADEMARK OFFICE
CERTIFICATE OF CORRECTION

PATENT NO. : 10,680,528 B2  
APPLICATION NO. : 16/100891  
DATED : June 9, 2020  
INVENTOR(S) : D. Meneses Herrera et al.

Page 1 of 1

It is certified that error appears in the above-identified patent and that said Letters Patent is hereby corrected as shown below:

On the Title Page

Item (54), Line 2, please change "CONVERTERS" to -- COVERTER --.

In the Claims

Column 18, Line 10 (Claim 16, Line 4), please change "an a gain" to -- a gain --.

Signed and Sealed this
Fourth Day of August, 2020

Andrei Iancu
*Director of the United States Patent and Trademark Office*